United States Patent [19]

Livingston

[11] B 3,918,935

[45] Nov. 11, 1975

[54] NON-NEWTONIAN LIQUID AND METHOD FOR WET SCRUBBING STACK GASES

[75] Inventor: William L. Livingston, Sharon, Mass.

[73] Assignee: Factory Mutual Research Corporation, Norwood, Mass.

[22] Filed: Aug. 13, 1973

[21] Appl. No.: 387,818

[44] Published under the Trial Voluntary Protest Program on January 28, 1975 as document no. B 387,818.

[52] U.S. Cl. ........................ 55/85; 55/228; 55/242
[51] Int. Cl.$^2$ ........................................ B01D 47/06
[58] Field of Search .................. 55/68, 73, 84–89, 55/227, 228, 242, 257, 229; 423/243, 575

[56] References Cited
UNITED STATES PATENTS

| | | | |
|---|---|---|---|
| 3,320,906 | 3/1967 | Domshidy | 55/89 |
| 3,761,406 | 9/1973 | Tsuk | 210/52 |
| 3,795,486 | 3/1974 | Ekman | 55/73 |

*Primary Examiner*—Charles N. Hart
*Attorney, Agent, or Firm*—Lane, Aitken, Dunner & Ziems

[57] ABSTRACT

A non-Newtonian scrubbing liquid for use in wet scrubbing pollutants from flue gases. The liquid comprises water, a polymeric additive material, preferably one that will complex when contacted with a bi- or trivalent salt, and lime or limestone. The size and stability of droplets formed in spraying such a liquid may be controlled so that they will penetrate a countercurrent of effluent gases. In so doing, the droplets will entrain particulates, including fly ash or sulfides resulting from the reaction of sulfur dioxide gases in the effluent and the lime or limestone, and form a sludge at the bottom of an apparatus. When contacted with a complexing salt, such as borax, the polymeric material in the sludge forms a fishnet structure which entrains the solids but contracts and releases water therefrom.

7 Claims, No Drawings

NON-NEWTONIAN LIQUID AND METHOD FOR WET SCRUBBING STACK GASES

BACKGROUND OF THE INVENTION

1. Field of the Invention

This invention relates to the removal of particulate and gaseous pollutants from effluents emanating from burning materials, especially fossil fuels such as coal and oil. More particularly, this invention is directed to a thickened scrubbing liquid containing a complexible polymer and to its use in a wet collection system so as to effectively and efficiently remove such pollutants from gaseous wastes.

2. Description of the Prior Art

The polluting materials removed from gaseous wastes according to the present invention are generally formed in the combustion of coal or oil and essentially comprise particulate materials, such as fly ash, and sulfur oxides; most often sulfur dioxide. A variety of procedures and apparatus are currently available for removing such pollutants from the above-mentioned gaseous wastes (more commonly referred to as "stack" or "flue" gases) including the removal of particulates by electrostatic precipitators. However, the present invention relates specifically to wet collection systems, including venturi scrubbers but more particularly to wet collectors of the type known as tail end wet scrubbers which may be generally classified as chamber scrubbers, mechanical scrubbers and the like. In all such wet scrubbers, a liquid, usually water containing calcium hydroxide (formed from lime) or calcium carbonate, is sprayed against the upward current of the stack gas so that the spray contacts and collects the particles in the gas while reacting with the sulfur dioxide gas to form a calcium sulfite or sulfate precipitate. While being effective in substantially purging the stack gases of pollutants, such procedures and apparatuses are not without attendant problems.

By way of example, since water is characterized by Newtonian flow behavior, its use as a scrubbing liquor in conventional methods produces a spray having a high population of fine droplets, a fact which imposes performance limits on a given method and proscribes the design and operating characteristics of the unit. Thus, boiler flue gases emanating from a furnace must be cooled before scrubbing to avoid vaporization of the water spray and intermediate beds and demisters must be provided to promote gas-spray contact and prevent carryover of the fine droplets to the atmosphere. While being effective in combating contact and carryover problems, the use of such intermediate core devices creates additional problems of corrosion, scaling and clogging. It is known to add various substances to an aqueous scrubbing liquor to alter the surface tension of droplets or promote adherence thereto of the particulates but no attention has been given in the past to controlling the effective size of the droplets in the scrubbing spray. All of this, of course, deals with removing the pollutants from flue gases but additional problems are created in conventional methods and apparatus for disposing of the resulting sludge which is normally dewatered in order to minimize the water pollution difficulties which would exist if drainage were simply allowed into the ground. Most installations use settling ponds as the primary means for separating the water from the sludge solids. However, such an approach to recovering the solids is not only time consuming but also does not lend itself to a continuous operation and increases the total capital and operating costs of the operation.

SUMMARY OF THE INVENTION

It has now been discovered that when an effective amount of a complexible, thickening agent is added to water or an aqueous suspension so as to produce a non-Newtonian, wet collection liquid, the drop size and stability of a spray formed from such a liquid may be controlled such that when sprayed at a sufficiently high initial discharge velocity it will penetrate a flue gas countercurrent, substantially without carryover, and effectively remove pollutants therefrom. As a result, the need for intermediate beds and demisters such as in conventional core scrubber designs is eliminated. In addition, the presence of a complexible material in the scrubbing liquor promotes a more efficient and convenient processing of the sludge extracted from the wet scrubber.

Accordingly, it is a primary object of the present invention to provide a complexible, non-Newtonian scrubbing liquor for use in wet scrubbing methods and apparatus.

It is an additional object of the present invention to provide a scrubbing liquor which may be formed into a spray having droplets of sufficient size and stability to efficiently remove and collect pollutants from a gas stream without appreciable carry-over.

It is a further object of the invention to provide a scrubbing liquor which, following entrainment of pollutants and its extraction from a wet scrubber as sludge, may be treated with a complexing agent to facilitate dewatering of the sludge and removal and disposal of the solids content thereof.

The means by which these and other objects of the present invention are achieved will become apparent from the following disclosure in which the invention comprises a scrubbing liquid for a wet collection apparatus comprising water and a complexible additive material. The amount of additive in such a liquid will be controlled so that when formed into a spray in a wet scrubbing procedure the size and stability of the spray droplets will be such that when discharged at a selected initial downward velocity they will penetrate an upward current of gaseous wastes, thereby collecting pollutants contained in such wastes and forming a sludge material which may be dewatered by treating it with a complexing agent to facilitate the removal and disposal of the solids content thereof.

DESCRIPTION OF THE PREFERRED EMBODIMENT

It has now been found that the operation and efficiency of wet collectors may be improved by utilizing as a scrubbing liquor an aqueous solution comprising up to 2 percent of a complexible material, the resulting solution being characterized by non-Newtonian behavior and drop size control. In a preferred embodiment the liquor will also contain an alkaline hydroxide or carbonate which will react with any contacting sulfur dioxide present in such gases to form corresponding sulfides which, together with entrained particulate materials, form a sludge which may be complexed as hereinafter described.

Complexible additive materials utilized in the present invention may include high molecular weight polymers including polysaccharides such as guar, polyacrylamide, and the like, but the preferred material will be polyvinyl alcohol. Such materials are added in amounts between about 0.2–2.0 percent by weight of the liquid phase. When polyvinyl alcohol is utilized as the complexible material it will constitute about 2.0 percent by weight of the liquid phase.

The precise diameter of the spray droplets required to penetrate a gaseous countercurrent will depend to a large extent on the velocity of the countercurrent and to a somewhat lesser extent on the type of additive utilized in forming the scrubbing liquid. However, since control of the droplet size is effected by the initial discharge velocity of the spray and the additive content, it is within the skill of the art to determine the size required to penetrate any given countercurrent. Also, while much attention is given in the present invention to the use of water containing an additive whose flow behavior is characterized as viscoelastic, it is within the scope of one aspect of the invention to employ other materials such as ablative gels which are characterized by plastic flow properties. While such materials are effective in producing a scrubbing liquid whose drop size and stability may be usefully controlled, generally they will not form the preferred complex with a complexing agent so that it becomes impossible to perform the recovery aspect of the present invention as hereinafter described.

In the preferred aspects of the present invention a scrubbing liquid is formed by adding a complexible material to water in an amount between about 0.6 to 2.0 percent by weight along with lime or limestone. The amount of lime or limestone utilized in such a scrubbing liquid is not important to the present invention and within the knowledge of those skilled in the art. Obviously, however, it should not be added in amounts such as to interfere with the liquid rheology control intended by the present invention. When sprayed in a countercurrent of gaseous wastes this scrubbing liquid will form spray droplets of sufficient size and stability such that carryover is substantially eliminated and the droplets penetrate the gaseous current to interact with the sulfur dioxide and remove it and any particulates therefrom.

An important feature of the present invention lies in the fact that the scrubbing liquid is able to suspend solids, resulting from its interaction with the gaseous stream, which may be heavier than, or lighter than, the liquid itself. Thus, there is a reduction in the migration of such solids in the liquid and in the precipitation of solids therefrom so that less scaling is noticed in the apparatus. In addition, the liquid has a tendency to continuously transport solids even if they settle out of the solution leading to a reduction in the common plugging factors (due to a buildup of deposits), an allowable higher solids content in the liquid, and contributes to a reduction in corrosion and inhibition of internal convection.

As the scrubbing liquid continuously removed pollutants from the gaseous stream, it forms thickened sludge at the bottom of the apparatus. In the preferred embodiment where the sludge contains a complexible polymer, it is then subjected to the second phase of this process including treatment with a complexer to change its viscoelastic behavior to a water-soluble complexed polymeric material from which water is easily extracted and solids recovered to be disposed of conveniently.

The complexer used in the present invention will be a bi- or trivalent salt including sodium and calcium chlorides as well as alkali metal borates and hydrates thereof, although the preferred complexer is borax, i.e., sodium tetraborate decahydrate. The complexer will generally be formed into a suspension or solution and may be applied to the polymer containing sludge in any amounts since even a small concentration of the salt will cause the complexing reaction to commence. However, in the preferred method, an amount of complexer will be applied to the sludge so as to provide a polymer-complexer ratio of 1:1–2 parts. Also in the preferred embodiment, the sludge will be continuously complexed as it is extracted from the scrubber and sent directly to a mechanical press for dewatering. However, the manner in which the complexer is applied to the sludge is not important and may be accomplished by any conventional method.

The complexing or syneresis between the polymer and the complexer is not clearly understood but it is important to note that when formed, it acts as something of a fishnet structure which entrains the solid contents of the sludge but automatically releases the water therefrom. In addition, the solids themselves proceed to shrink to make up for the lost volume resulting from the released water. This shrinking of the complexed material occurs automatically following contact of the sludge with the bi- or trivalent salt. However, squeezing of the complexed sludge will further decrease its bulk density and moisture content. Thus, by using a conventional shop press, complexed sludge having a water content of about 25% by weight and a bulk dry density of about 1.4 gpm/cc has been achieved.

It is apparent from the foregoing that the present invention may be used in a variety of apparatus utilizing wet scrubbing methods including lime kilns, refuse incinerators, steel furnaces, smoke stacks and the like.

Thus, the above embodiments are to be considered in all respects as illustrative and not restrictive since the invention may be embodied in other specific forms without departing from its spirit or essential characteristics. The scope of the invention is indicated by the claims rather than by the foregoing description, and all changes which come within the meaning and range of the equivalents of the claims are intended to be embraced therein.

I claim:

1. A process for removing pollutants from a current of gaseous wastes which comprises,
    providing a non-Newtonian scrubbing liquid containing water, an alkaline hydroxide or carbonate, and a complexible polymeric material,
    spraying said scrubbing liquid against said current of gaseous wastes at an initial velocity sufficient to form droplets which will penetrate the gaseous current and remove pollutants therefrom, thereby forming a sludge material, and
    contacting the sludge material with a bi- or trivalent salt so as to cause said polymeric material to form a complex structure which will entrain the solids content of the sludge but release a substantial portion of water therefrom.

2. A process as defined in claim 1 wherein said scrubbing liquid contains polyvinyl alcohol in an amount of 2.0 percent by weight based on the liquid phase thereof.

3. A process as defined in claim 1 wherein said scrubbing liquid contains guar in an amount of 0.6 percent by weight based on the liquid phase thereof.

4. A process as defined in claim 1 where said Bi- or trivalent salt is selected from sodium sulfate or calcium chloride, alkali metal borates, and hydrates thereof.

5. A process for removing pollutants from a current of gaseous wastes which comprises,
providing a non-Newtonian scrubbing liquid containing water, an alkaline hydroxide or carbonate and a polymeric additive material,
spraying said scrubbing liquid against said current of gaseous wastes at an initial velocity sufficient to form droplets which will penetrate the gaseous current and remove pollutants therefrom, thereby forming a sludge material, and
collecting and disposing of said sludge material.

6. A process as defined in claim 4 wherein said polymeric material is guar.

7. A process as defined in claim 5 wherein said scrubbing liquid contains guar in an amount between about 0.2 and 0.6 percent by weight of the liquid phase thereof.

* * * * *